J. E. RODRIGUEZ SERRA.
FILM HOLDER.
APPLICATION FILED JAN. 15, 1920.
1,422,785.
Patented July 11, 1922.
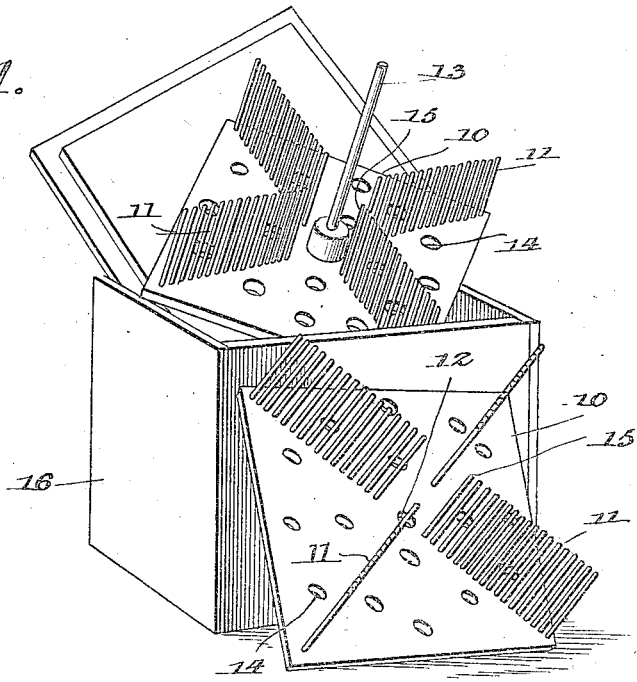
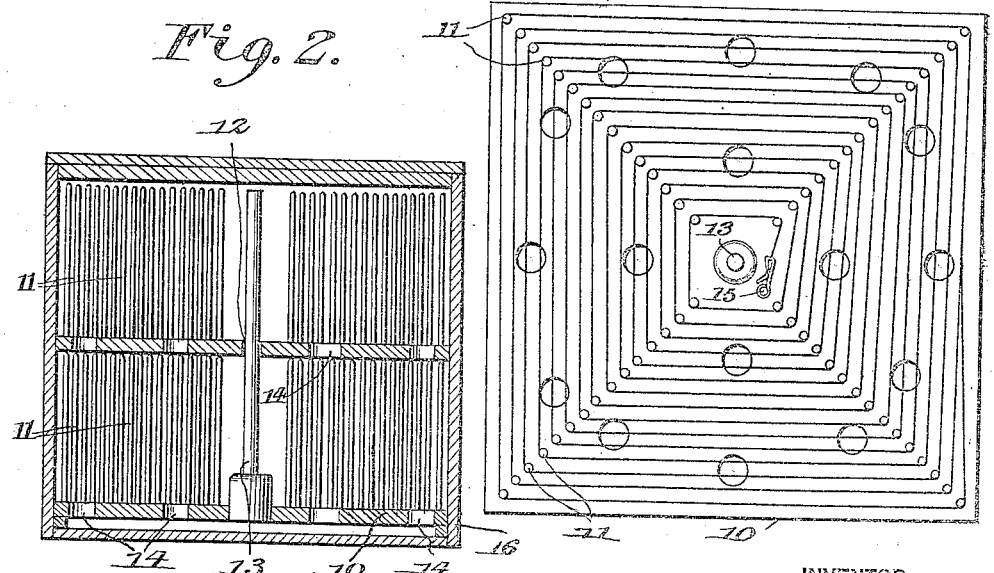
INVENTOR
José E. Rodriguez Serra.
BY
Victor J. Evans
ATTORNEY

UNITED STATES PATENT OFFICE.

JOSÉ E. RODRIGUEZ SERRA, OF PONCE, PORTO RICO.

FILM HOLDER.

1,422,785.  Specification of Letters Patent.  Patented July 11, 1922.

Application filed January 16, 1920. Serial No. 351,748.

*To all whom it may concern:*

Be it known that I, JOSÉ E. RODRIGUEZ SERRA, a citizen of the United States, residing at Ponce, in the county of Ponce, Porto Rico, have invented new and useful Improvements in Film Holders, of which the following is a specification.

This invention relates to improvements in film holders which consists essentially of means for supporting the photographic film during the carrying out of the developing, rinsing, fixing and washing operations, and a tank for confining a developing solution and for receiving the said means which supports the photographic film or films.

Some of the objects of this invention are; to produce a film holder which may support a comparatively large number of ordinary photographic films, which films may be properly and effectively treated by the use of a comparatively small amount of developing solution confined by a tank which receives the film holder; to economize the use of film developing solution; to construct the film holder that a comparatively large number of films may be quickly and easily placed upon the holder for its proper development, rinsing, fixing and washing without having to unload the films from the holder or otherwise requiring handling of the film itself for any of these distinctive necessary treatments of the film. With these and other objects in view, the invention resides in the particular construction and provision of parts hereinafter more fully described and illustrated in the accompanying drawings, in which:—

Figure 1 is a perspective view illustrating several component parts of the device.

Figure 2 is a sectional view illustrating the relative disposition of the parts as they occur when the device is in use.

Figure 3 is a plan view illustrating the manner in which the film is supported.

The device will essentially require a film holder and a tank which receives said holder and which tank will also contain and confine a proper liquid or solution for the treatment of the film or films.

The film holder may consist of a single element or the same may consist of a plurality of elements which are substantially of similar construction. In the present instance the film holder is shown as consisting of several elements which are adapted to be arranged in superposed relation and in this condition to be placed within the tank.

Each of the elements comprising the film holder consists of a base member 10 which supports groups of spaced bars or posts 11, which are disposed vertically with relation with the base member 10. The base members of certain of said elements each has an opening 12 therein for the reception of a post 13 secured to the base member of a particular one of the elements so that the several elements may be arranged in superposed relation. Each of the base members 10 is provided with apertures 14 for a purpose to appear. For loading the elements which make up the film holder, several lengths of film may be tacked together by the use of adequate film clips or of ordinary pins, so as to make a long continuous ribbon out of the several lengths of film, which then will be made into a roll. One end of the film is then placed between co-acting members of a film clip of any suitable construction which is attached to the bar 15 nearest the center of the base member. The long continuous band of film is then wound about the bars 11 in convolute form and in a manner so that the coated side of the film faces away from a central point of the base member so that the back or uncoated side of the film will rest against the bars to thus avert the destructive effacement of the coating of the film. The outer free end of the film may be attached to a lead of the film directly adjacent thereto by means of an ordinary pin or any other device suitable for the purpose of attaching the end of the film to said lead. The film is placed or wound about the bars 11 in preferably slightly stretched condition.

Where the film or films to be treated are of a quantity which requires the use of but one holder element, the one which embodies the post 13 is used. However, in cases where the number of films to be treated is such as to require at least two elements, or possibly three elements, the elements are arranged in superposed relation in the manner indicated hereinabove.

For the treatment of the film or films, the elements which support the same are immersed in the proper solution contained in the tank 16, singly, or collectively in superposed relation, as the case may be. For best results the elements of the holder are moved up and down several times by virtue of the central post 13 to insure that the solution gets to every part of the film. For best results the reciprocation of the film holder should be repeated every five or ten minutes, which will keep the solution uniformly mixed and in this way the very best results will be obtained. The apertures 14 in the base members permit the solution to percolate through the base member so that the solution may get to every part of the film or films.

From the foregoing, it will be manifest that practically 70 feet of film can be developed at one time in a tank not using more than three-quarters of a cubic foot of solution with the resultant economic use thereof and that a comparatively large amount of film can be developed, rinsed, fixed and washed at one time in comparatively little time without having to unload the films from the holder during the carrying out of these distinctive operations, thus avoiding handling, staining of the hands, scratching or effacing the coated face of the film or films, it being necessary only to simply remove the film holder as loaded from the container or tank holding the developing solution to other containers provided for the rinsing, fixing and washing of the film or films.

What is claimed as new is:—

1. A holder comprising a plurality of racks each of which includes an apertured base member and film supporting means; and means on one of said members for maintaining the base members in spaced relation.

2. A film holder comprising a plurality of racks, each of said racks including an apertured base member and spaced groups of spaced bars, the said bars serving to maintain a length of film in condition for its development; and means for maintaining a superposed and detachable relation of the racks.

3. A holder comprising a plurality of film racks, each including an apertured base member and relatively spaced groups of spaced bars secured to and disposed vertically relatively thereto, a central post secured to the base member of one of the racks and adapted to extend through an aperture in the base member of the other rack so as to maintain the racks in a superposed and detachable relation.

In testimony whereof I have affixed my signature.

JOSÉ E. RODRIGUEZ SERRA